United States Patent [19]

Komori et al.

[11] Patent Number: 5,658,097

[45] Date of Patent: Aug. 19, 1997

[54] SOIL OR GROUND QUALITY STABILIZER AND TREATMENT METHOD

[75] Inventors: Teruaki Komori; Tsukio II; Akira II; Kiyoshi II; Takayoshi Mizoguchi, all of Fukuokaken, Japan

[73] Assignee: Fe Lime Industry Corporation, Fukuokaken, Japan

[21] Appl. No.: 567,185

[22] Filed: Dec. 14, 1995

[51] Int. Cl.[6] .............................. B09B 3/00; C04B 28/22; C09K 17/00; E02D 3/12

[52] U.S. Cl. ........................ 405/263; 106/706; 106/707; 106/793; 106/811; 404/76; 588/256; 588/257

[58] Field of Search ..................................... 405/258, 263; 106/705, 706, 707, 710, 793, 811, 900; 210/751; 404/76; 588/256, 267

[56] References Cited

U.S. PATENT DOCUMENTS

| | | | |
|---|---|---|---|
| 2,942,993 | 6/1960 | Handy et al. | 106/900 X |
| 3,030,222 | 4/1962 | Eichenlaub | 106/705 X |
| 4,040,852 | 8/1977 | Jones | 106/705 X |
| 4,615,810 | 10/1986 | Conner | 210/751 |
| 4,911,757 | 3/1990 | Lynn et al. | 106/707 X |
| 5,143,481 | 9/1992 | Schumacher et al. | 405/263 X |
| 5,143,550 | 9/1992 | Willacy | 106/900 X |
| 5,456,553 | 10/1995 | Ii et al. | 405/263 |
| 5,501,719 | 3/1996 | Shida et al. | 405/263 X |

*Primary Examiner*—George A. Suchfield
*Attorney, Agent, or Firm*—Longacre & White

[57] ABSTRACT

The present disclosure concerns a soil or ground quality stabilizer comprising a mixture formed by mixing a burned sewage sludge ash the main contents of which are CaO, $SiO_2$ and $Al_2O_3$ with a lime of calcium hydroxide to reduce hydraulicity and a fine Fe oxides mixture powder byproduced in steel production the main content of which is iron oxide. The soil or ground quality stabilizer is added into a pavement material containing crushed stones, natural soil, etc. to improve the strength and viscoelasticity of the natural soil and can give a desired CBR strength to the soil having an increased moisture content. The preferable adding ratio of the fine Fe oxides mixture powder into the mixture of the burned sewage sludge ash and the lime of calcium hydroxide is within the range of 15–35 weight %.

6 Claims, 17 Drawing Sheets

Chemical Reaction Formula

CBR Test Result of Decomposed Granite(Natural Moisture Content: abt.9 w.%) Added with Stabilizer CBR Test Result of Decomposed Granite(Natural Moisture Content: abt.9 w.%) Added with Stabilizer CBR Test Result of Decomposed Granite(Natural Moisture Content: abt.9 w.%) Added with Stabilizer CBR Test Result of Decomposed Granite with Increased Moisture Content (Stabilizer Adding Ratio: 7%)

CBR Test Result of Decomposed Granite with Increased Moisture Content (Stabilizer Adding Ratio: 7%)

CBR Test Result of Decomposed Granite with Increased Moisture Content (Stabilizer Adding Ratio: 7%)

Single Axial Compression Test Result of Decomposed Granite
(Natural Moisture Content: abt.9 w.%) Added with Stabilizer by 7%

Single Axial Strain at Maximum Stress of Decomposed Granite
(Natural Moisture Content: abt.9 w.%) Added with Stabilizer by 7%

○······○ Example 1
△······△ Example 2
×······× Comparison Example

CBR Test Result of Sirsu (Natural Moisture Content:abt. 22.5%) Added with Stabilizer by 7%

CBR Test Result of Sirsu (Natural Moisture Content: abt. 22.5%) Added with Stabilizer by 9%

CBR Test Result of Sirsu (Natural Moisture Content:abt. 22.5%) Added with Stabilizer by 11%

CBR Test Result of Sirsu with Increased Moisture Content Added with Stabilizer (Adding Ratio: abt. 7%)

CBR Test Result of Sirsu with Increased Moisture Content Added with Stabilizer (Adding Ratio:abt. 7%)

CBR Test Result of Sirsu with Increased Moisture Content Added with Stabilizer by 7%

Single Axial Compression Test Result of Sirsu (Natural Moisture Content: abt. 22.5w.%) Added with Stabilizer Single Axial Strain at Maximum Stress of Sirsu (Natural Moisture Content:abt.22.5w.%) Added with Stabilizer by 7%

SOIL OR GROUND QUALITY STABILIZER AND TREATMENT METHOD

BACKGROUND OF THE INVENTION

1. Field of the Invention

This invention concerns a soil or ground quality stabilizer produced by mixing a highly pure fine iron oxide powder byproduced in steel production, a burned sewage sludge ash byproduced at municipal sewage disposal plants and a highly pure slaked lime together and a treatment method of adding the soil or ground quality stabilizer into a soil or ground and mixing together to enhance the strength and viscoelasticity of the soil or ground.

2. Description of the Prior Art

The total length of paved roads would be approximately 770,000 km or about 70% of the total roads of 1,110,000 km and the roads paved with asphalt concrete (a pavement to make the surface with asphalt concrete) would be above 95% of the paved roads in Japan. The shear strength of the asphalt concrete can be maintained by keeping the air voids of the mixture at a specified percentage (3–7%). However, the viscosity resistance of asphalt is greatly dependent on the temperature and as the resistance falls during the hot summer, the asphalt concrete would be tightened by heavy traffic loads to decrease the air voids percentage.

When the air voids percentage falls below 2%, the shear strength would sharply drop and a fluid rutting occurs to lose the pavement function. However, should the air voids percentage of the asphalt concrete be larger than the specified percentage, the asphalt in the mixture would react with oxygen and be hardened to lose the viscosity and a crack destruction would occur due to a lack of flexibility during the cold winter.

Japan is a long and slender chain of islands extending from the north to the south and because of its topographical features of sharp difference in the altitudes, the climatic conditions are such rigorous one to the asphalt pavement as heavy snow in the northern Japan and in the mountains during winter and the rise in the temperature up to 60° C. at the surface of the asphalt concrete with 30° C. of ambient temperature in summer. Further the traffic conditions are such that the registered heavy vehicles in Japan are about 10 times more than those registered in a major country in Europe and a larger destructive action is being given to the pavement in Japan. For this reason the paved roads are designed to be durable for ten years in Japan.

Nevertheless, the heavy traffic roads are apt to cause fluid ruttings due to the insufficient strength in hot summer and relatively less heavy traffic roads lose the pavement function due to a crack destruction caused by the insufficient flexibility through an aging of the asphalt.

As a result, such heavy traffic roads in general area are obliged to be repaired in 3–4 years after the service was started, since the fluid rutting reaches the serviceable limit. Such counter-measures for the fluid rutting as an improvement of the thermal sensitivity of the asphalt are being taken but there were other problems like a crack that occurred frequently and sufficient measures have not yet been established. The method of adding lime has been used to stabilize or reinforce a soil or ground for many years and the reaction mechanism is (1) to make a lump of the soil particles through an ion-exchange reaction on the particle surface and (2) to give a hardening action through the formation of calcium carbonate. However, according to recent research, (3) noncrystalline substances such as silica($SiO_2$) or alumina ($Al_2O_3$) which forms the clay or colloids in the soil or ground would hydrate with lime in the soil or ground to produce calcium silicate hydrate or calcium aluminate hydrate. These materials in a single form or in a composit form can serve as a binder to increase the strength and to maintain the durability.

In general, this reaction is called Pozzolan Reaction and the success of a soil or ground quality stabilizing with lime is considered to be dependent on the Pozzolan Reaction.

In case a soil or ground quality stabilizing material made from natural soil added with lime or cement is used as a pavement construction material, the strength and the viscoelasticity are in the relationship of antinomy each other.

For instance, it was impossible to obtain the properties having above 1.0% strain at the maximum stress and above 10 Kg/cm$^2$ of the single axis compression strength simultaneously.

Now such properties have become obtainable by using a soil or ground quality stabilizing material made from a Fe oxides mixture added with lime and the purpose intended was achieved tentatively. The soil or ground quality stabilizing material which is a blend of a fine Fe oxides powder and slaked lime or quick lime or lime stone powder shall be called "Fe lime" in this specification hereafter.

The inventors of this application have made some inventions based on this Fe lime with acceptable achievements so far.

For instance, the inventions are on a paved road construction method by making the soft base of subgrade intermediate course with a mixture of natural soil, converter slag, a fine iron oxide powder and slaked lime (please refer to Japan Patent Publication No. 52-7256), and on a simplified road pavement construction method by providing a reinforced soil or ground material course as an intermediate course in between the base material course and the subgrade to utilize the chemical reaction of natural soil added with a fine iron oxide powder and slaked lime (please refer to Japan Patent Publication No. 54-25738) and further on a prevention method of settlement due to consolidation by reinforcing the soft base by making the surface ground with a reinforced soil or ground material made from natural soil added with a fine iron oxide powder and slaked lime and by making the thickness of the reinforced soil or ground material course the one that can secure an elastic coefficient below the critical deflection against the load of constructed structure (Japan Patent Application Laid Open No. 63-134709).

The Fe lime process is to replace a part of the ground subgrade with the treated soil of pavement materials containing soil added and mixed with the Fe lime. This process does not require much rolling pressure for compression hardening and a relatively uniform strength is obtainable and for this reason the process is recognized as Sandwitch process.

This process can reduce the pavement thickness remarkably and give a fairly longer service life as compared with the process of replacing with a good soil. The structural dynamic analysis of this mechanism has not yet been made but it is considered that the improved viscoelasticity of the soil or ground strata treated with the Fe lime works as a cushion against traffic loads. It is further considered that such characteristics may be obtained through a combined reaction between the conventional stabilizing reaction by the lime and a conditional change in the iron of the fine iron oxide powder caused by the coexistance with the slaked lime (Magazine [Pavement] 28-6, 1993 by Yorimasa Abe et al).

The Fe lime containing the fine iron oxide powder and the slaked lime is also mixed with red mud containing Ti oxide to produce a soil or ground reinforcing material which is added into a pavement material containing crushed stones, natural soil, etc. (U.S. Pat. No. 5,456,553).

The soil or ground stabilizing treatment using the Fe lime is able to produce a fairly good quality material because in case the soil in which the Fe lime is to be mixed (the soil used) is a decomposed granite which is a remained soil of weathered granite rock, it contains much reactive noncrystalline materials (such as $SiO_2$, $Al_2O_3$ and $Fe_2O_3$).

However, if the soil used is a high crystalline material consisting of $SiO_2$ which is represented by silica sand such as a hill sand, riverbed earth and sand and gravel soil containing less clay or unweathered pyroelastic flow deposit the main mineral of which is volcanic glass and most of the contents are sand and silt called sirsu, there is such a problem that the soil contains little noncrystalline material and therefore the strength intended cannot be obtained.

The object of this invention is to present a new soil or ground quality stabilizer and a treatment method thereof that can give the strength and viscoelasticity intended to each course in the pavement by making the soil or ground quality stabilizer of a specific composition without limiting to a specific soil to be used. The soil or ground quality stablizer according to the present invention and the treatment method can improve the strength greatly without impairing the deflection property of the conventional stabilized or reinforced soil or ground material with the Fe lime. Hence, an application of this invention to the base upper course of a heavy traffic road has become possible and the deflection of a pavement can be substantially reduced and such a structural destruction of the pavement and a fluid rutting can be prevented by the buffer action of the viscoelasticity as well.

Another object of this invention is to provide a stabilizing method of a soil or ground quality that can give a specified California Bearing Ratio (CBR) or other industry standard strength to the soil or ground having an increased moisture therein.

SUMMARY OF THE INVENTION

This invention concerns a soil or ground quality stabilizer produced by adding a mixture of a burned sewage sludge ash and a highly pure slaked lime or a lime of calcium hydroxide to a highly pure and extremely fine iron oxide rich Fe oxides mixture powder and mixing together in order to reduce the hydraulicity thereof and a soil or ground quality stabilizing treatment method for pavement materials containing crushed stones, natural soil, etc. into which the soil or ground quality stabilizer is added.

The burned sewage sludge ash having CaO, $SiO_2$ and $Al_2O_3$ as the main contents is effective and mixing ratio of the fine Fe oxides mixture powder to the mixture of the burned sewage sludge ash and the slaked lime within the range of 15–35 weight % is also effective.

The adding of the soil or ground quality stabilizer according to this invention into a soil or ground is to generate Pozzolan reaction to form calcium silicate hydrate or calcium aluminate hydrate by hydration of Pozzolan component in the soil or ground, namely noncrystalline materials such as silica ($SiO_2$) or alumina ($Al_2O_3$).

On the other hand the soil or ground quality stabilizer generates the reaction as shown in FIG. 1 under a strong alkaline condition caused by the slaked lime dissolved in the moisture in the soil or ground. The reaction is to hydrate the mixture of Al—Fe oxides under alkaline condition to form [1] an activated Al—Fe hydrated oxides dispersed between aggregate particles in gel condition. Then irreversible chemical reaction takes place under physical actions such as compression with oxygen to develop the crystalline with the lapse of time into the formation of Al—Oxygen bonding chain showing typically strong bonding power of Aluminum with silicic acid and Fe—Oxygen bonding chain showing typically viscoelastic performance of Fe.

These are to combine with calcium slicate hydrate formed by the Pozzolan reaction to reach [2] a structurally stable composite crystalline condition.

The reaction mechanism of the soil or ground quality stabilizer according to the present invention added to and mixed together with a soil or ground is a reaction combined with the Pozzolan reaction as shown in FIG. 1.

The burned CaO and $SiO_2$ contained in the burned sewage sludge ash are dispersed in the soil or ground quality stabilizer and absorb the moisture in a soil or ground to form a slaked lime (from CaO to $Ca(OH)_2$) when mixed with the soil or ground and therefore both materials make no direct reaction to show a hydraulicity and it is considered that the $SiO_2$ would be identical to the noncrystalline silica ($SiO_2$) in the soil or ground and would work effectively to promote the strength of the treated soil or ground in addition to the above-stated hydration reaction.

BRIEF DESCRIPTION OF THE DRAWINGS (FIG. 1) This Figure is a formula describing the mechanism of the chemical reaction when the soil or ground quality stabilizer is added to soil with regard to the embodiments of this invention.

(FIG. 2) This Figure is a graph showing CBR Test Result of the soil of decomposed granite treated by adding with the soil or ground quality stabilizer by 5 weight % with regard to the embodiments of this invention.

(FIG. 3) This Figure is a graph showing CBR Test Result of the soil of decomposed granite treated by adding with the soil or ground quality stabilizer by 7 weight % with regard to the embodiments of this invention.

(FIG. 4) This Figure is a graph showing CBR Test Result of the soil of decomposed granite treated by adding with the soil or ground quality stabilizer by 9 weight % with regard to the embodiments of this invention.

(FIG. 5) This Figure is a graph showing CBR Test Result of the treated soil of decomposed granite with moisture content increased up to 11.4%.

(FIG. 6) This Figure is a graph showing CBR Test Result of the treated soil of decomposed granite with moisture content increased up to 14.2%.

(FIG. 7) This Figure is a graph showing CBR Test Result of the treated soil of decomposed granite with moisture content increased up to 17.0%.

(FIG. 8) This is a graph showing Single Axial Compression Test Result indicating the relationship between the Single Axial Strength and the age of the soil of decomposed granite treated by adding with the soil or ground quality stabilizer with regard to the embodiments of this invention.

(FIG. 9) This Figure is a graph showing Strain Test Result indicating the relationship between the strain at the maximum stress and the age of the soil of decomposed granite treated by adding with the soil or ground quality stabilizer with regard to the embodiments of this invention.

(FIG. 10) This Figure is a graph showing CBR Test Result of the soil of sirsu treated by adding by 7 weight % with the soil or ground quality stabilizer with regard to the embodiments of this invention.

(FIG. 11) This Figure is a graph showing CBR Test Result of the soil of sirsu treated by adding by 9 weight % with the soil or ground quality stabilizer with regard to the embodiments of this invention.

(FIG. 12) This Figure is a graph showing CBR Test Result of the soil of sirsu treated by adding by 11 weight % with the soil or ground quality stabilizer with regard to the embodiments of this invention.

FIG. 13) This Figure is a graph showing CBR Test Result of the treated soil of sirsu with moisture content increased up to 25.5%.

(FIG. 14) This Figure is a graph showing CBR Test Result of the treated soil of sirsu with moisture content increased up to 28.5%.

FIG. 15) This Figure is a graph showing CBR Test Result of the treated soil of sirsu with moisture content increased up to 31.5%.

(FIG. 16) This Figure is a graph showing Single Axial Compression Test Result indicating the relationship between the Single Axial Strength and the age of the soil of sirsu treated by adding with the soil or ground quality stabilizer with regard to the embodiments of this invention.

(FIG. 17) This Figure is a graph showing Strain Test Result indicating the relationship between the strain at the maximum stress and the age of the soil of sirsu treated by adding with the soil or ground quality stabilizer with regard to the embodiments of this invention.

DESCRIPTION OF THE PREFERRED EMBODIMENTS

Figure 1:
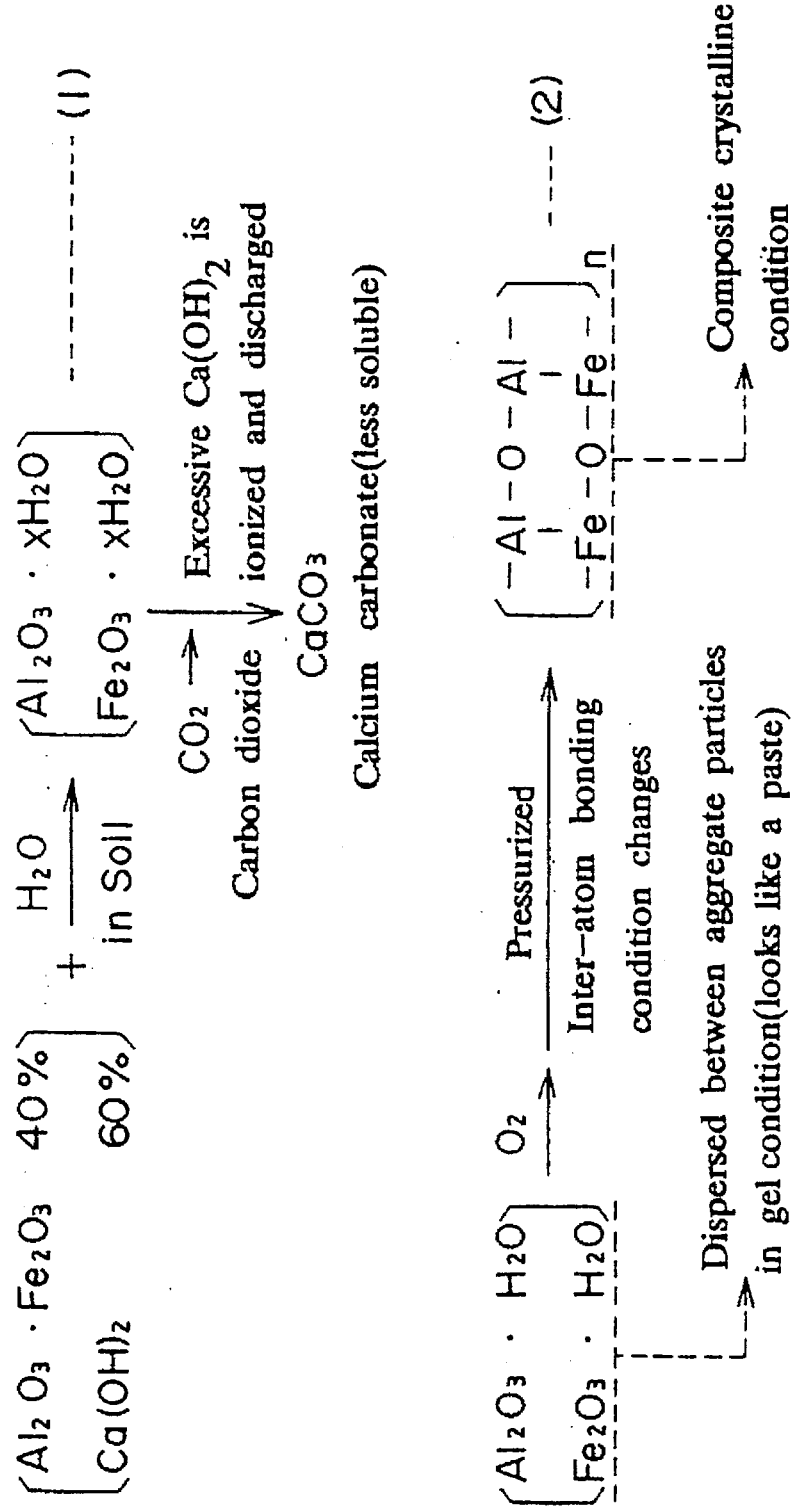

The embodiments of this invention are described in detail as follows:

1) Production of the soil or ground quality stabilizer

The raw material, a burned sewage sludge ash which is a fine powder having an approximately 20 micron particle size in average is byproduced at municipal sewage disposal plants where the burned sewage sludge ash is obtained through processes comprising a filtration of the sewage for purification, an addition of a coagulant such as lime, iron chloride, poly-aluminum chloride, etc., a dewatering by a filter press, and a burning in an incinerator (at approximately 800° C.).

The chemical analysis indicates, as shown in Table 1, approximately 30% CaO, 25% $SiO_2$, 11% $Al_2O_3$, 8% $P_2O_5$ and 7.5% total Fe content by weight respectively and as the sludge is burned at about 800° C., the sludge ash is hydraulic through chemical reactions similar to a portland cement when mixed with water.

The Fe oxides mixture is a highly fine powder dust byproduced in steel production and the chemical analysis indicates, as shown in Table 2, 95% $Fe_2O_3$ with 67% total iron content by weight and therefore the major content is iron oxide. The slaked lime is available in the market and the chemical analysis is shown in Table 3.

The burned sewage sludge ash as shown in Table 1 is first mixed with the slaked lime shown in Table 3 and dispersed uniformely. Then the mixture is further mixed with the fine Fe oxides mixture powder shown in Table 2 to produce the soil or ground quality stabilizer.

The chemical analysis is shown in Table 4. The mixing ratio of the burned sewage sludge ash with the slaked lime was 40 to 60 in Example 1 and 20 to 80 in Example 2 and the mixing ratio of the fine Fe oxides mixture with the mixture of the burned sewage sludge ash and the slaked lime was 25% (dry weight percentage) in these Examples. The soil or ground quality stabilizer having the chemical analysis as shown in Example 1 and Example 2 is represented as Fe (Ash-lime) hereunder. The Fe lime shown as comparison in Table 4 is the conventional soil or ground quality stabilizer of the mixture of the fine Fe oxides mixture with the slaked lime.

2) Stabilizing treatment of soil

Comparative dynamic properties was considered by means of CBR Test and Single Axial Compression Test with natural soil treated by adding thereto and mixing together therewith the soil or ground quality stabilizer.

The soil or ground quality stabilizer shown in Table 4 was added to and mixed with the treated soil by 5%, 7% and 9% (dry weight compound) respectively and test samples were prepared according to CBR single layer 20 times 5 layers stick-hardening by CBR Test of JIS (Japan Industrial Standard) A 1211. The stick-hardening work is Ec=9.2 cm.kg f/cm$^2$ for both CBR Test and Single Axial Compression Test. The moisture content after the stick-hardening was made as it was when a specified soil or ground quality stabilizer was added to and mixed with the natural soil at the soil collection depot. The ageing of the test samples for the CBR Test was made by water immersion for each period just after the stick-hardening.

The test samples for the single axial compression test were tighly sealed and aged at the ambient temperature just after the stick-hardening to the day before each sample age. Then the air was discharged by water with negative suction pressure and saturated (for 30 minutes) and then put in water for a 24-hour immersion ageing.

The other test methods were performed in accordance with "Pavement Test Handbook" compiled and published by The Japan Highway Association.

2-1) Strength test of soil using decomposed granite

The decomposed granite is a remained deposit of weathered granite rock and extensively distributed in the western Japan. The engineering properties of the decomposed granite is such that some are remarkably converted to clay depending on the weathered condition but generally it is a sandy soil about 10–20% portion of which contains above 2 mm gravel and about 5–10% below 0.005 mm clay and the soil can be stabilized with a stabilizer containing cement or lime. The soil (decomposed granite) is a typically natural soil used with the Fe lime stabilizer and was collected for the present examples from Touya area in Nakagawa Town, Fukuoka Prefecture, Japan.

The physical properties are shown in Table 5 and the chemical properties in Table 6.

Figure 2:
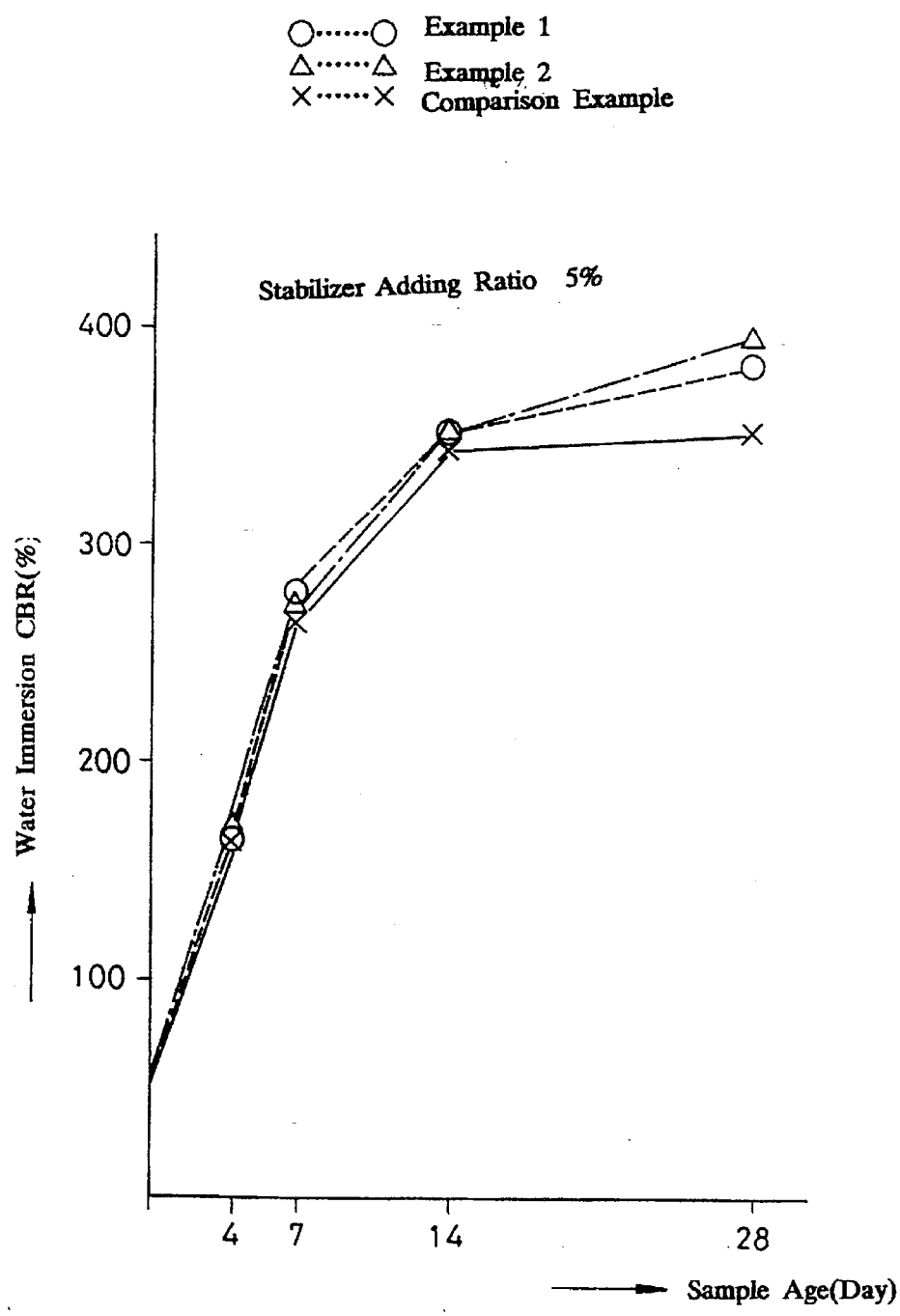
Figure 3:
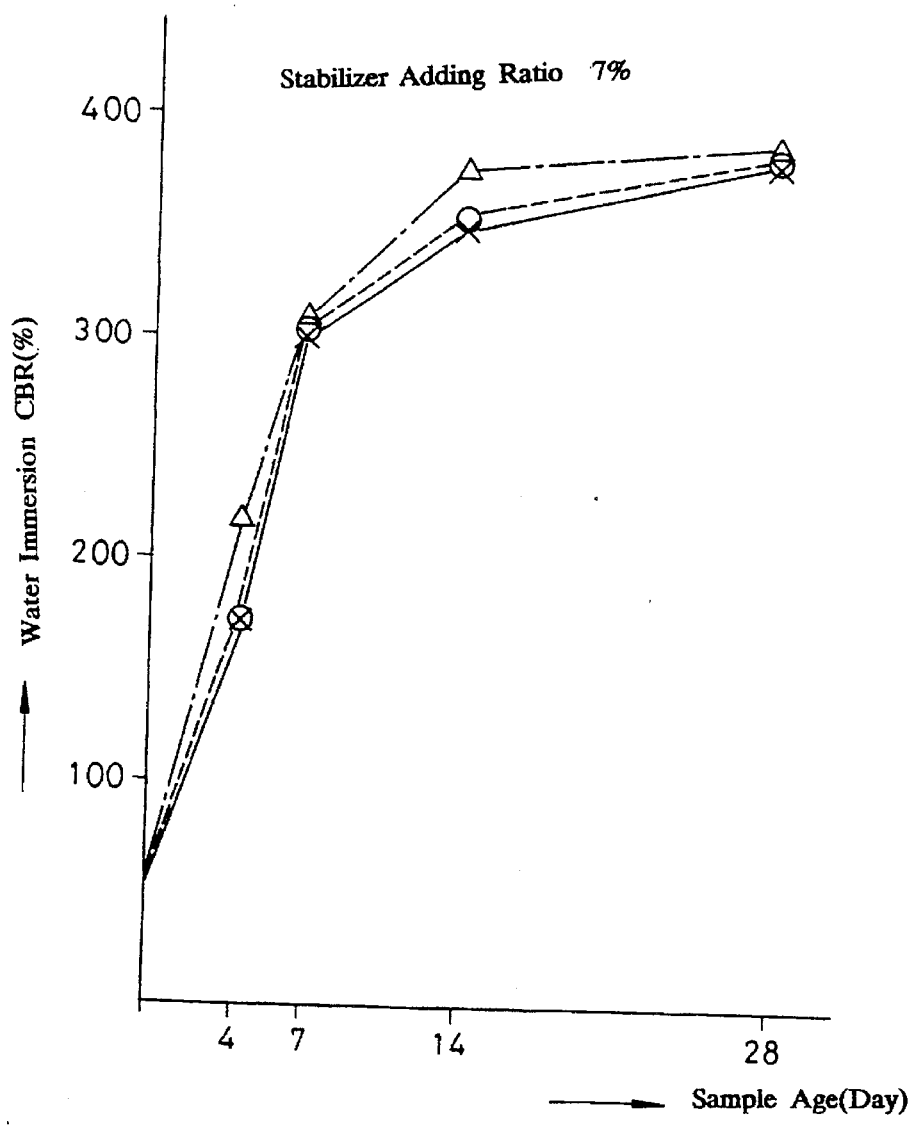
Figure 4:
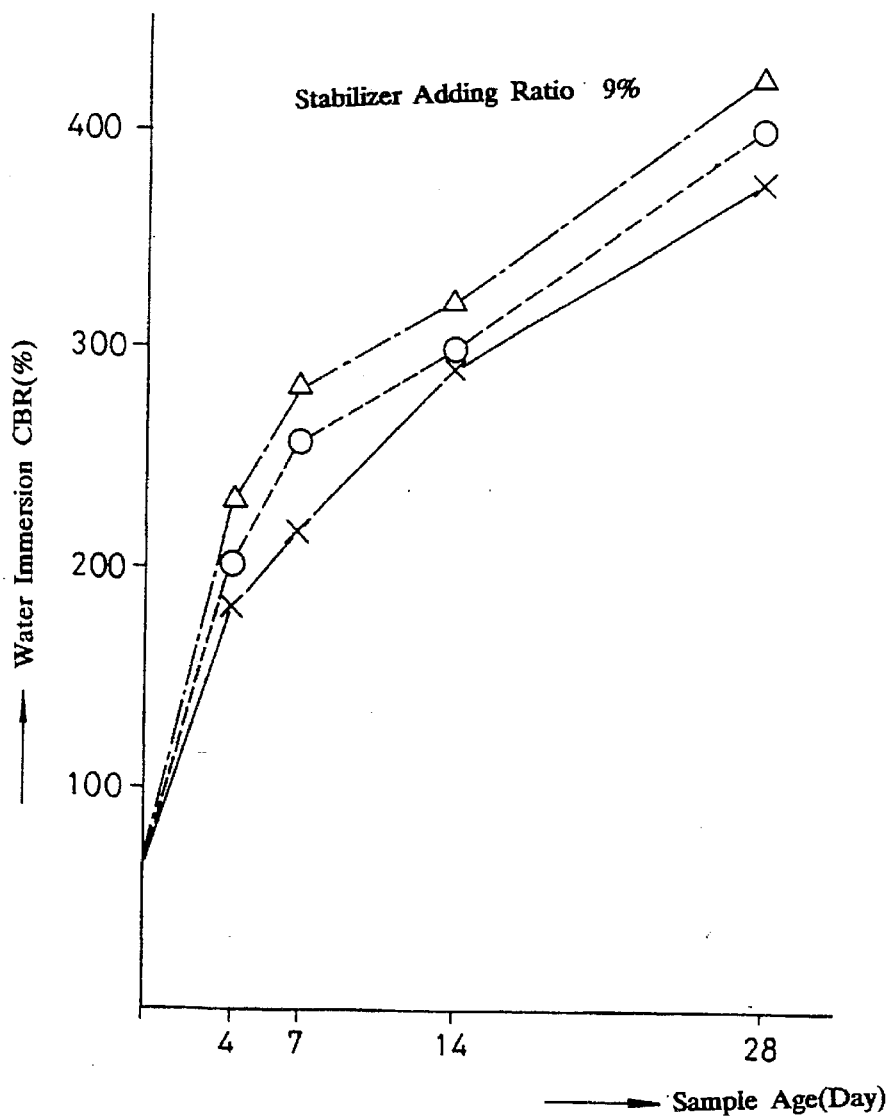

The soil or ground quality stabilizer indicated in Table 4 was added to the decomposed granite (natural moisture content: 9 weight %) by adding ratio of about 5%, 7% and 9% (dry weight compound). The CBR Test Results are shown in FIG. 2, FIG. 3 and FIG. 4. The sample ages were just after the stick-hardening, 4 days, 7 days, 14 days and 28 days.

As the test results clearly indicate, no large difference in the strength between the samples of the Examples 1 and 2 treated with the stabilizer was seen as compared with soil treated with the Fe lime shown in the Comparison Example at any adding ratio but this indicates no less excellent propertes of this stabilizer as compared with those of the conventional Fe lime.

Especially, the strength was approximately 20% higher than the Comparison Example at 9% adding ratio over the sample ages from 4 through 28 days (approximately 30% higher with initial samples in 4–7 days).

Figure 5:
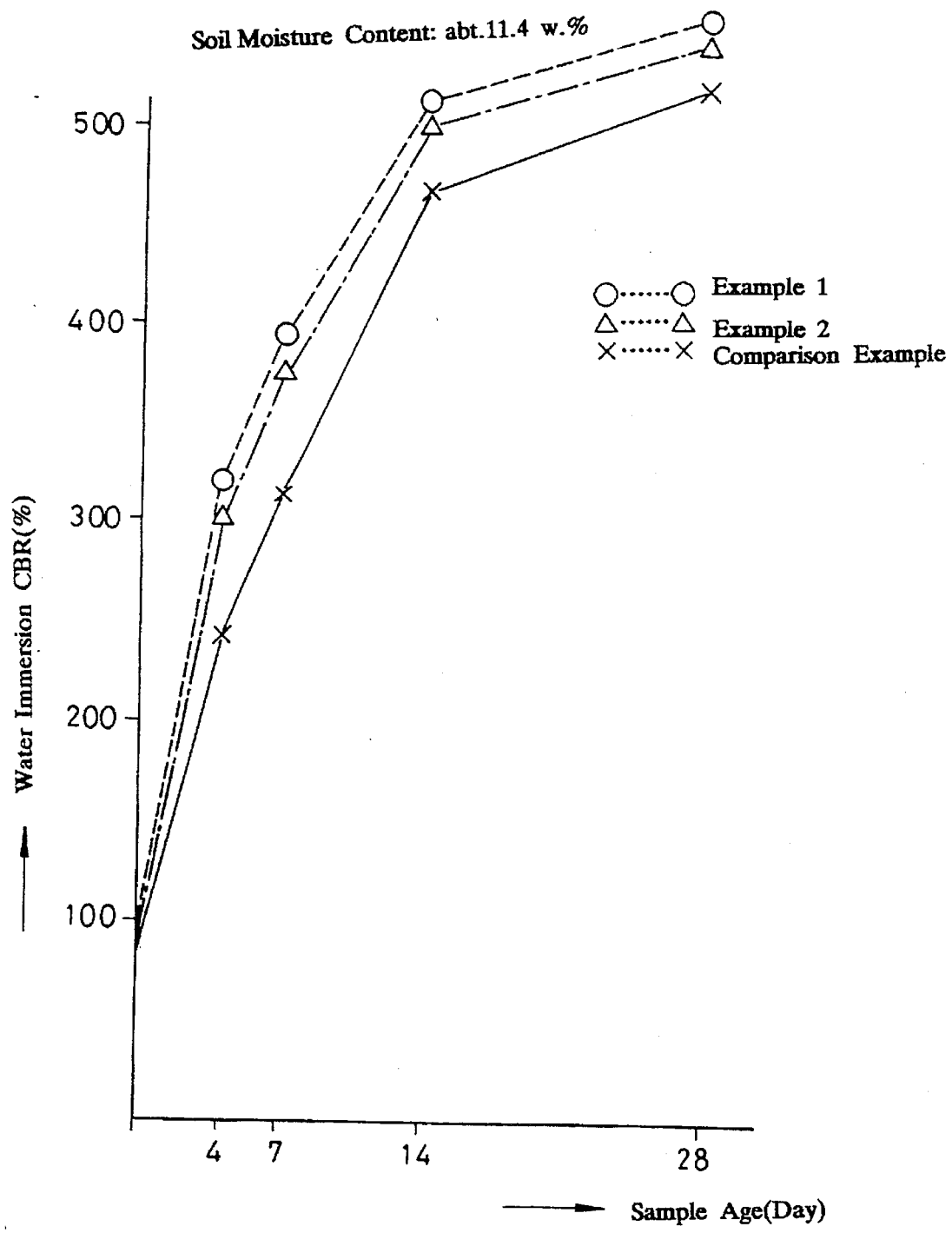
Figure 6:
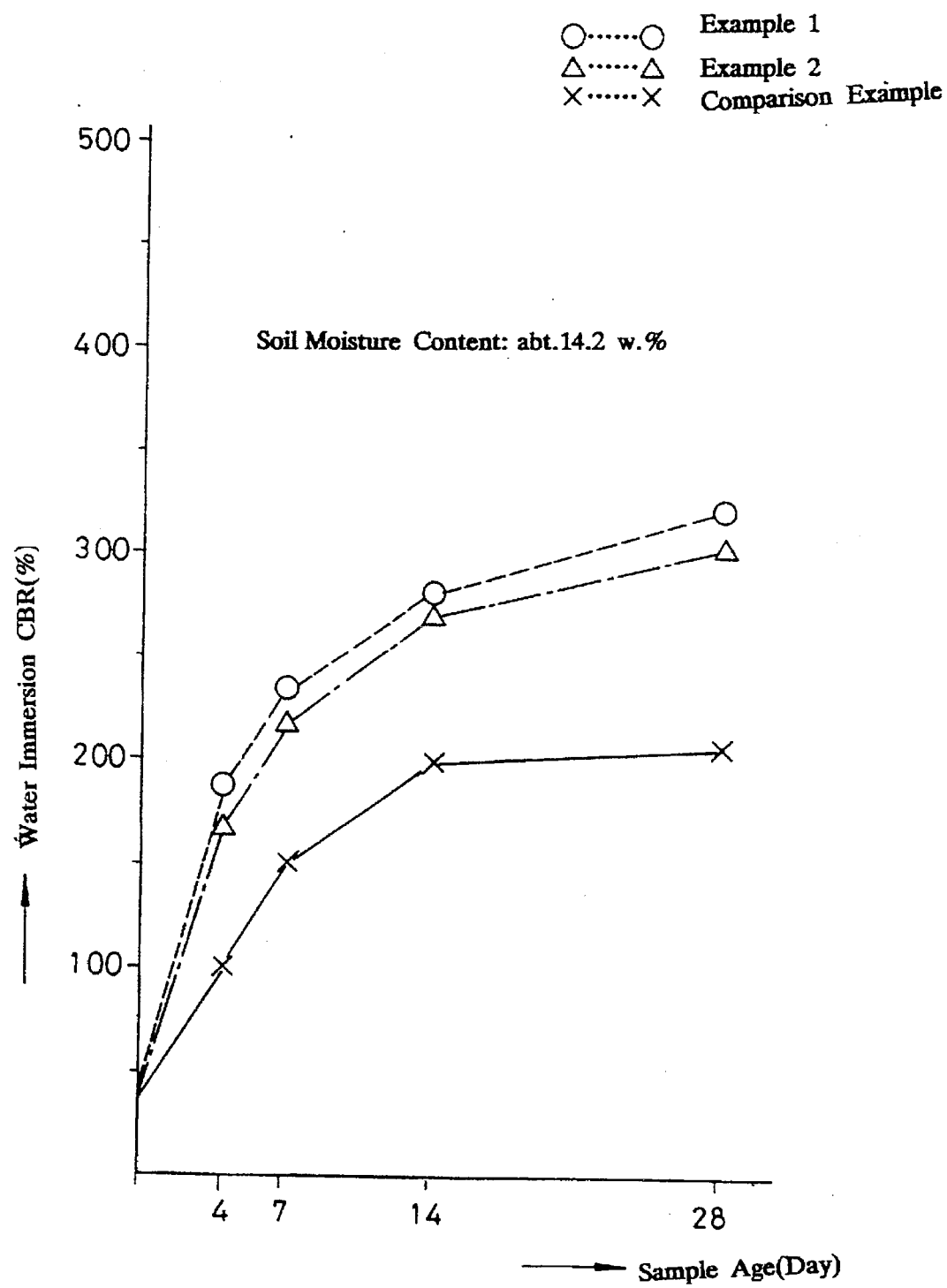
Figure 7:
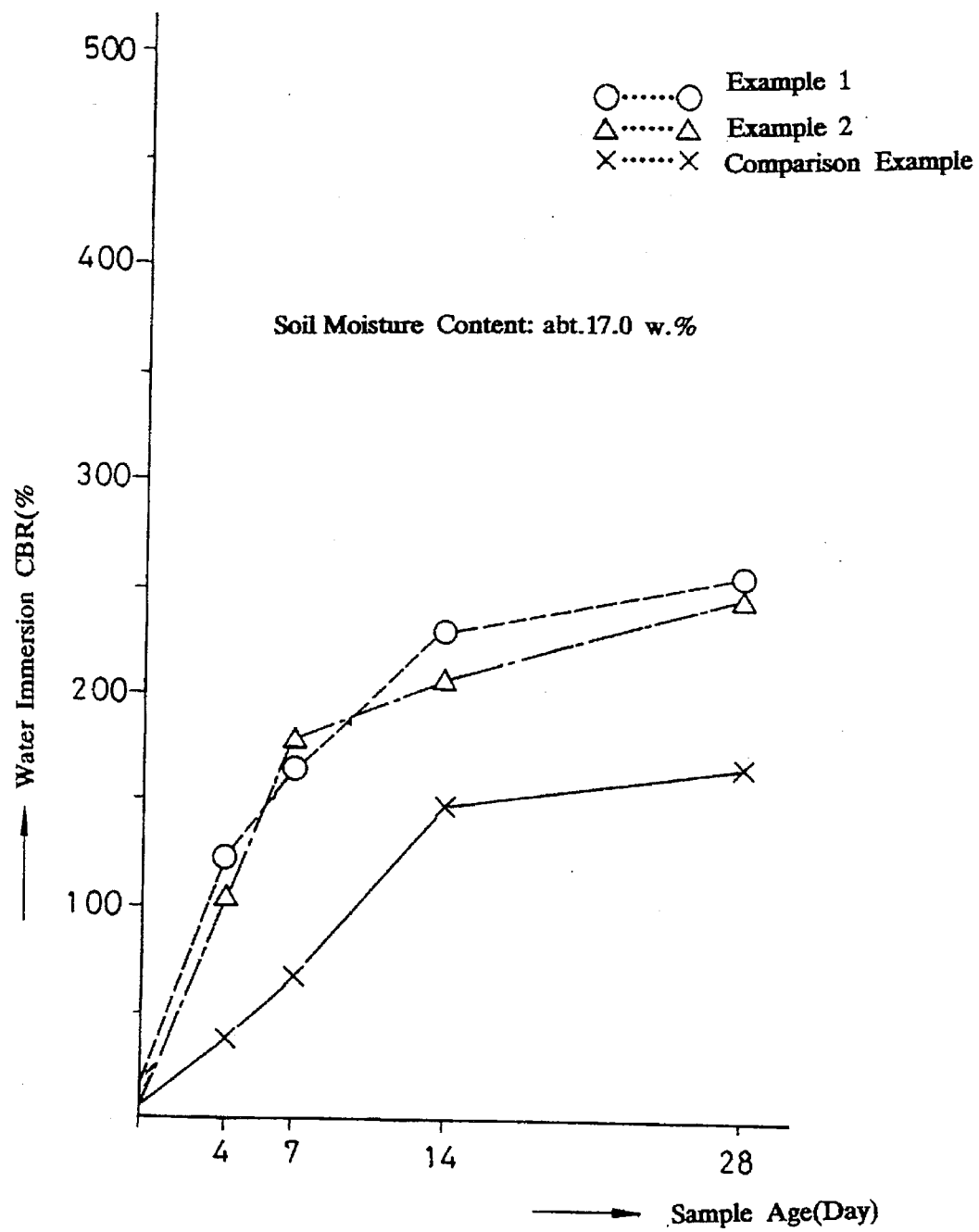

CBR Test Results of the decomposed granite samples having increased moisture contents up to 11.4%, 14.2% and 17.0% (7% adding ratio of the stabilizer) are shown in FIG. 5, FIG. 6 and FIG. 7.

As shown in the above Figures, with regard to the relationship between the sample age and the CBR strength at each moisture content no large difference in the strength was seen between the the soils of Example 1 and Example 2 mixed with the Fe(Ash-lime) and the Fe lime of the Comparison Example having the natural moisture content (about 9 weight %) but higher strengths were obtained with increased moisture contents. Especially, the youngest sample of Example 1 had a higher strength by about 1.4 times at about 11.2 weight % moisture content, by about 1.7 times at about 14.2% and by about 2.7 times at about 17.0% as compared with the soil mixed with the Fe lime.

Figure 8:
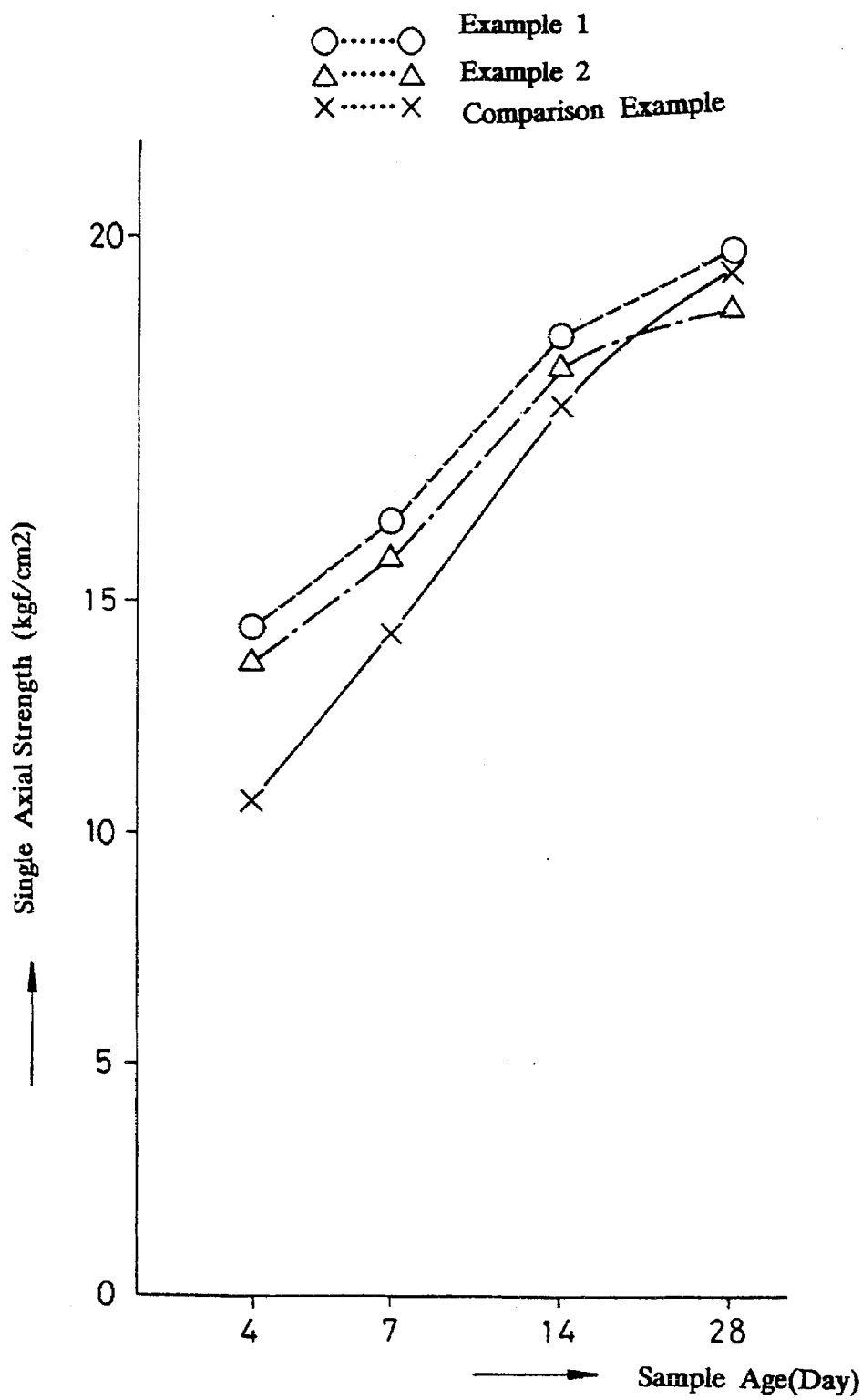

FIG. 8 indicates Single Axial Compression Test Results of the decomposed granite (about 9 weight % natural moisture content) treated by adding and mixing by about 7% (dry weight compound) with the soil or ground quality stabilizer shown in Table 4.

With regard to the relation between the Sample Age and the Single Axial Strength ($kgf/cm^2$) of the soil mixed with Fe(Ash-lime) of Examples 1 and 2 the strength was approximately 14.0 with 4 days sample and increased up to approximately 21.5 with 28 days sample. The single axial strength of 4 days sample was about 1.27 times higher and about the same with 28 days sample as compared with the soil mixed with the Fe lime of the Comparison Example.

The strength was relatively quickly obtainable but showed almost the same strength in long term.

Figure 9:
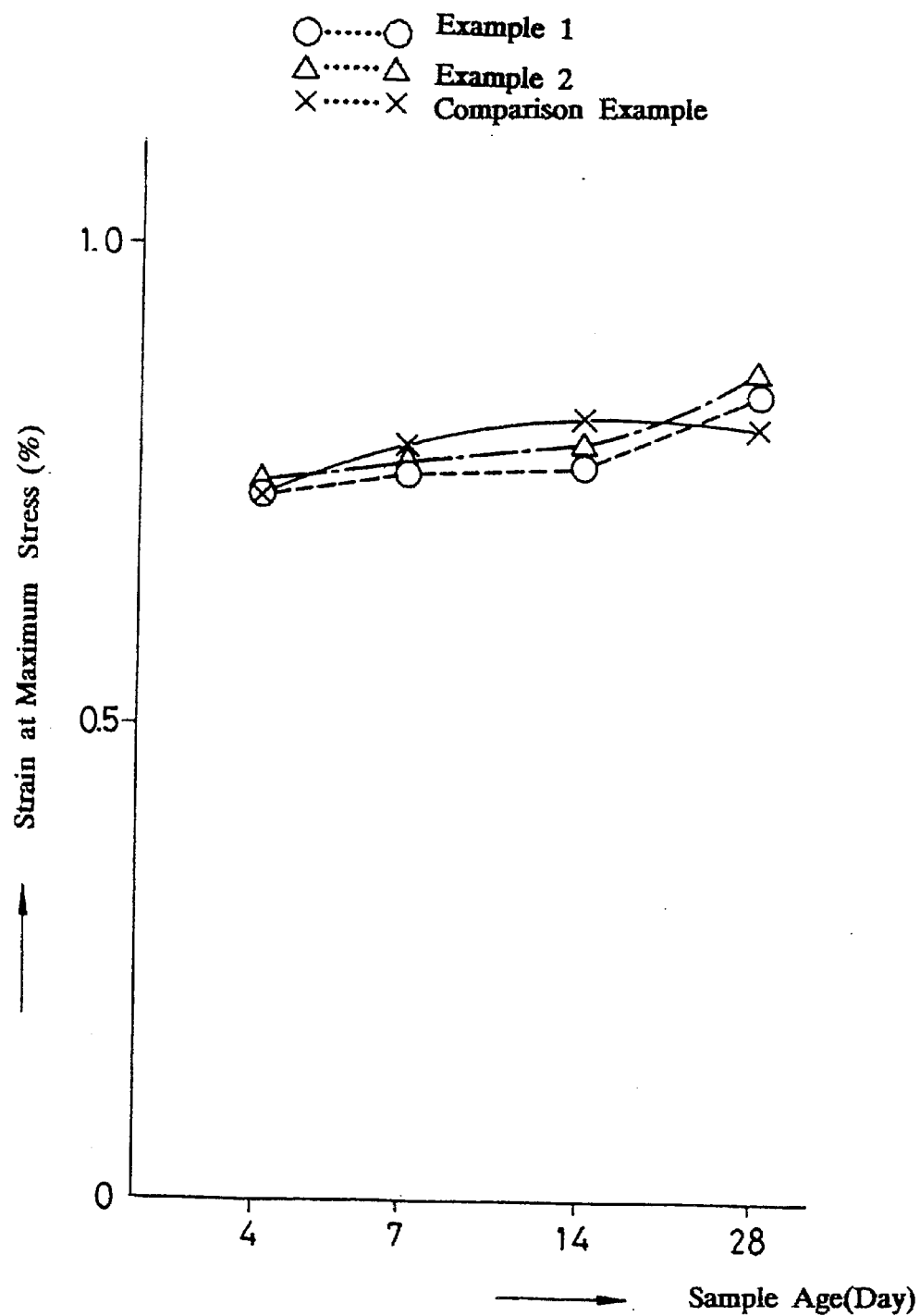

FIG. 9 indicates the strain at the maximum stress of the decomposed granite (about 9 weight % natural moisture content) added and mixed with the soil or ground quality stabilizer shown in Table 4 by about 7% (dry weight compound).

The Figure clearly indicates that with regard to the relationship between the sample age and the single axial strain at the maximum stress no large difference in the strength between the samples of both Examples 1 and 2 and the soil treated with the Fe lime shown in the Comparison Example is seen after the stick-hardening but this indicates no less excellent propertes of this stabilizer than the soil treated with the conventional Fe lime.

2-2) Strength test with the soil of sirsu

The sirsu is a deposit of volcanic effluent extensively distributed in southern kyushu of Japan and most of the composite particles are of volcanic glass and pumice. Hence the specific gravity of the particle (2.30–2.50) is lower than that of the general soil and is fragile to friction and breakable. Its major contents are sand and silt with a little contents of above 2 mm gravel fraction and 0.005 mm clay. The soil used was collected at a soil depot in Kagoshima City and the specific gravity of the soil particles and the particle size distribution are shown in Table 7 and the chemical composition in Table 8.

Figure 10:
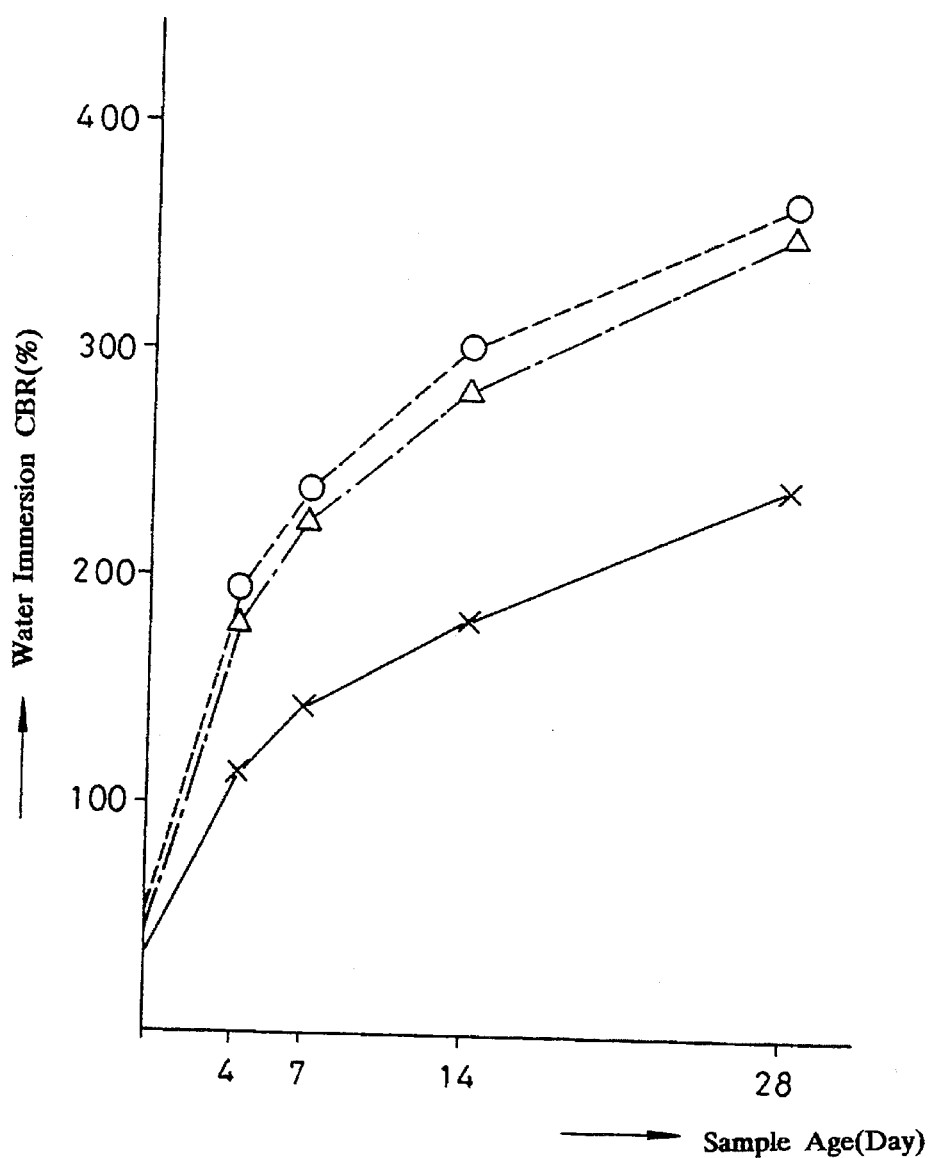
Figure 11:
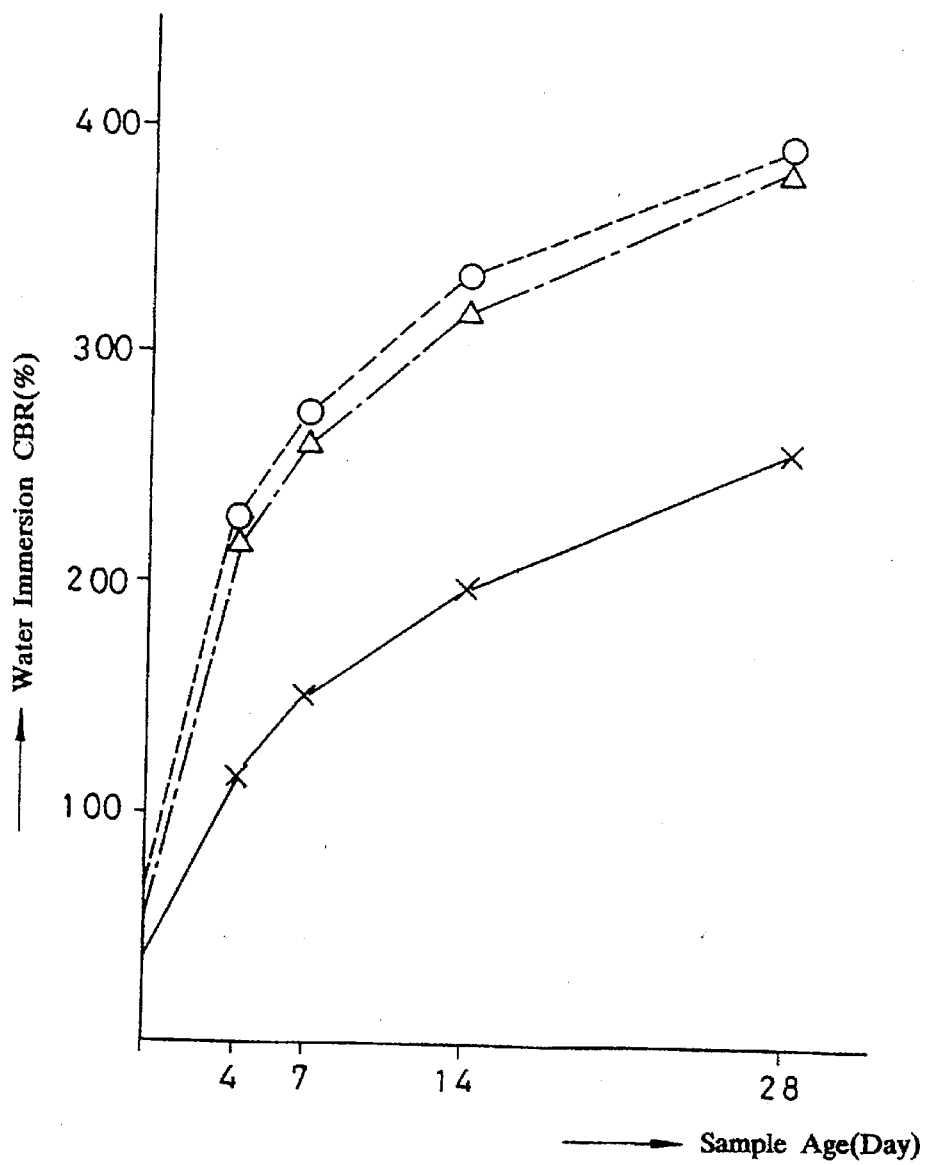
Figure 12:
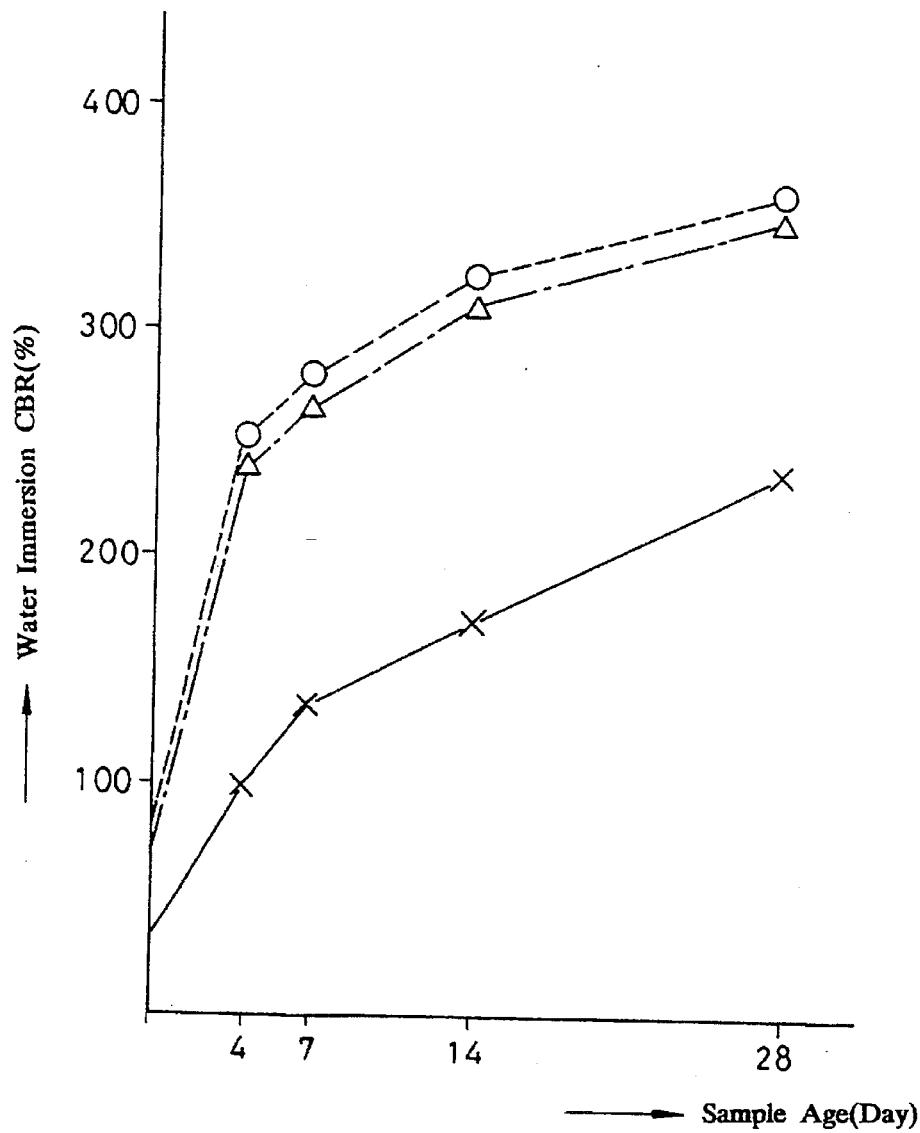

The soil or ground quality stabilizer shown in Table 4 was mixed into the sirsu (natural moisture content: about 22.5 weight %) at about 7%, 9% and 11% adding ratio (dry weight compound) and the CBR Test Results are shown in FIGS. 10, 11 and 12. The sample ages were just after the stick-hardening, 4 days, 7 days, 14 days and 28 days.

The CBR Test Result clearly indicates that the strengths of the samples of both Examples 1 and 2 in any adding ratio were much higher than those of the soil treated with the Fe lime shown in Comparison Example after the stick-hardening.

Figure 13:
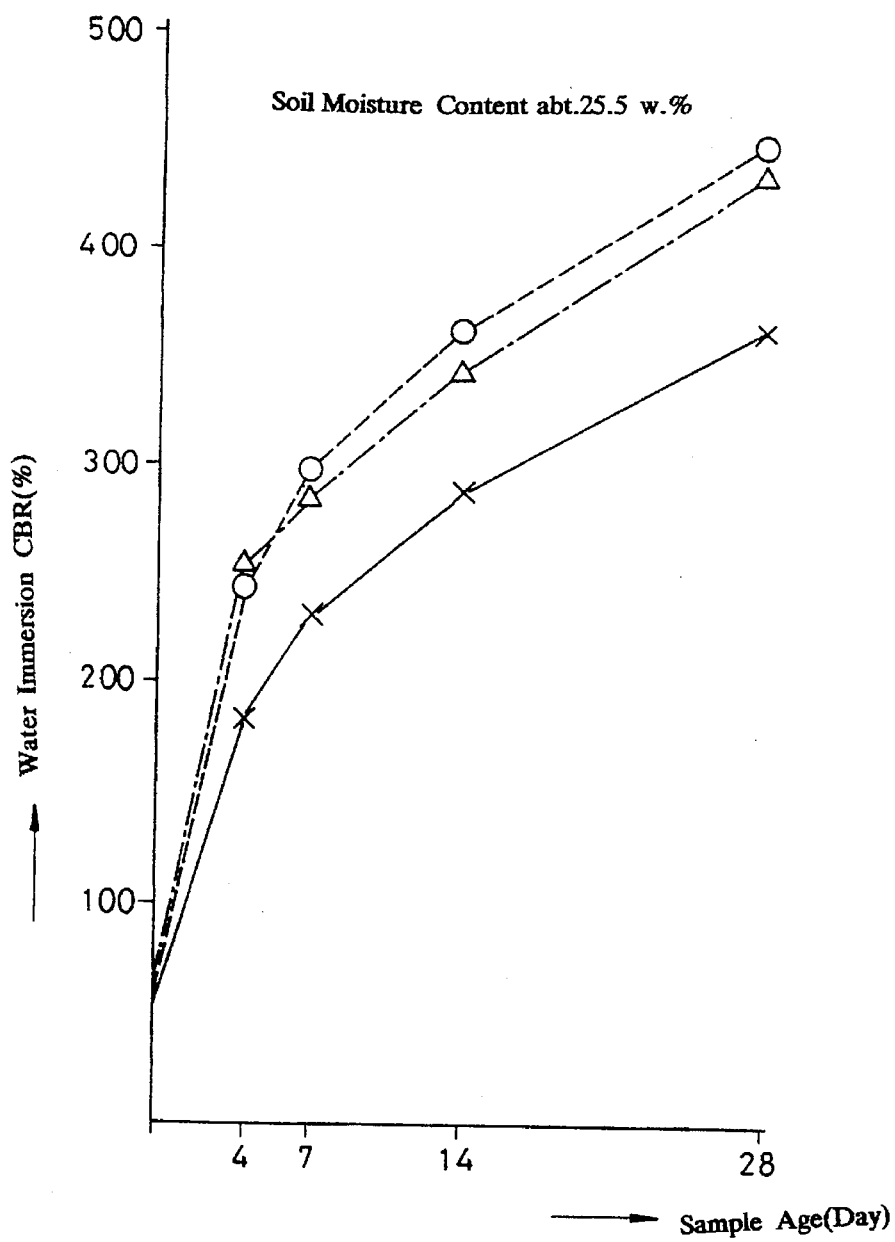
Figure 14:
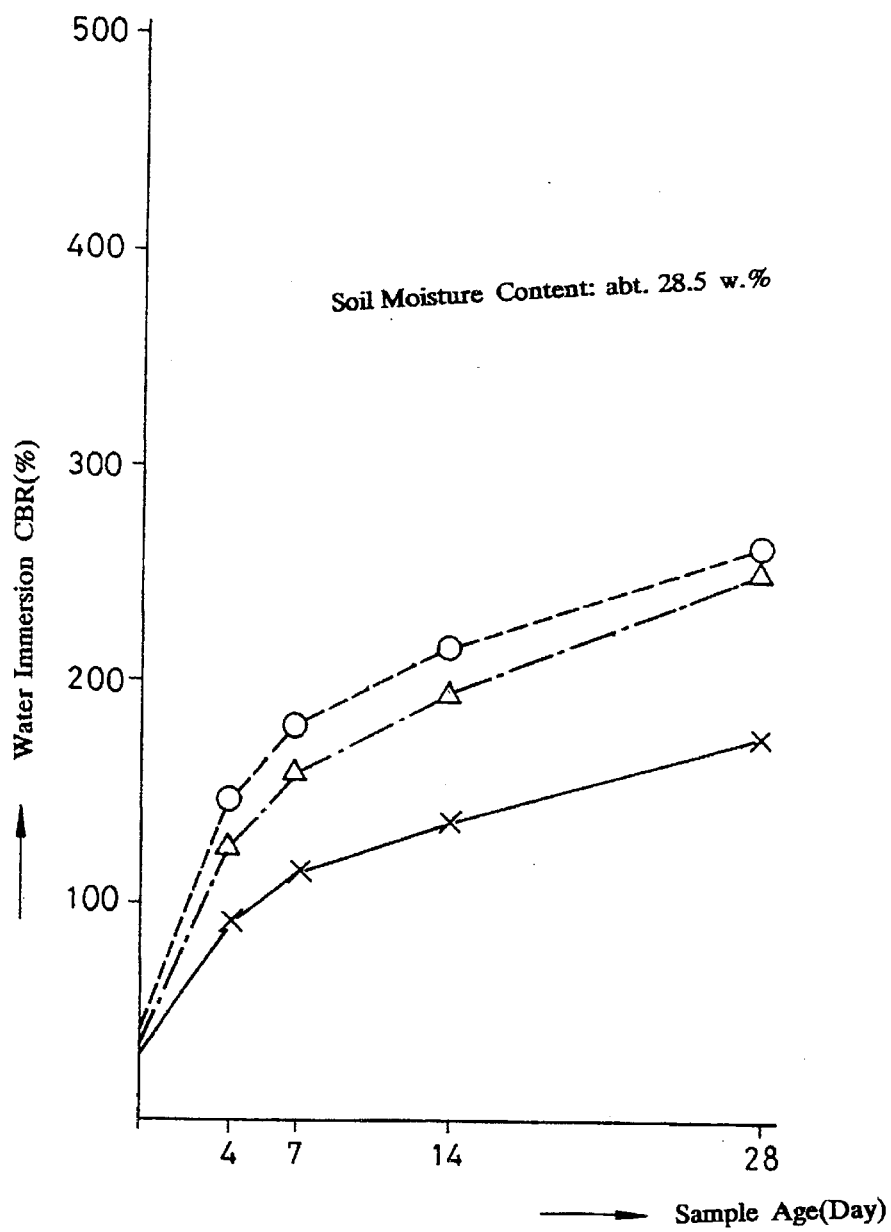
Figure 15:
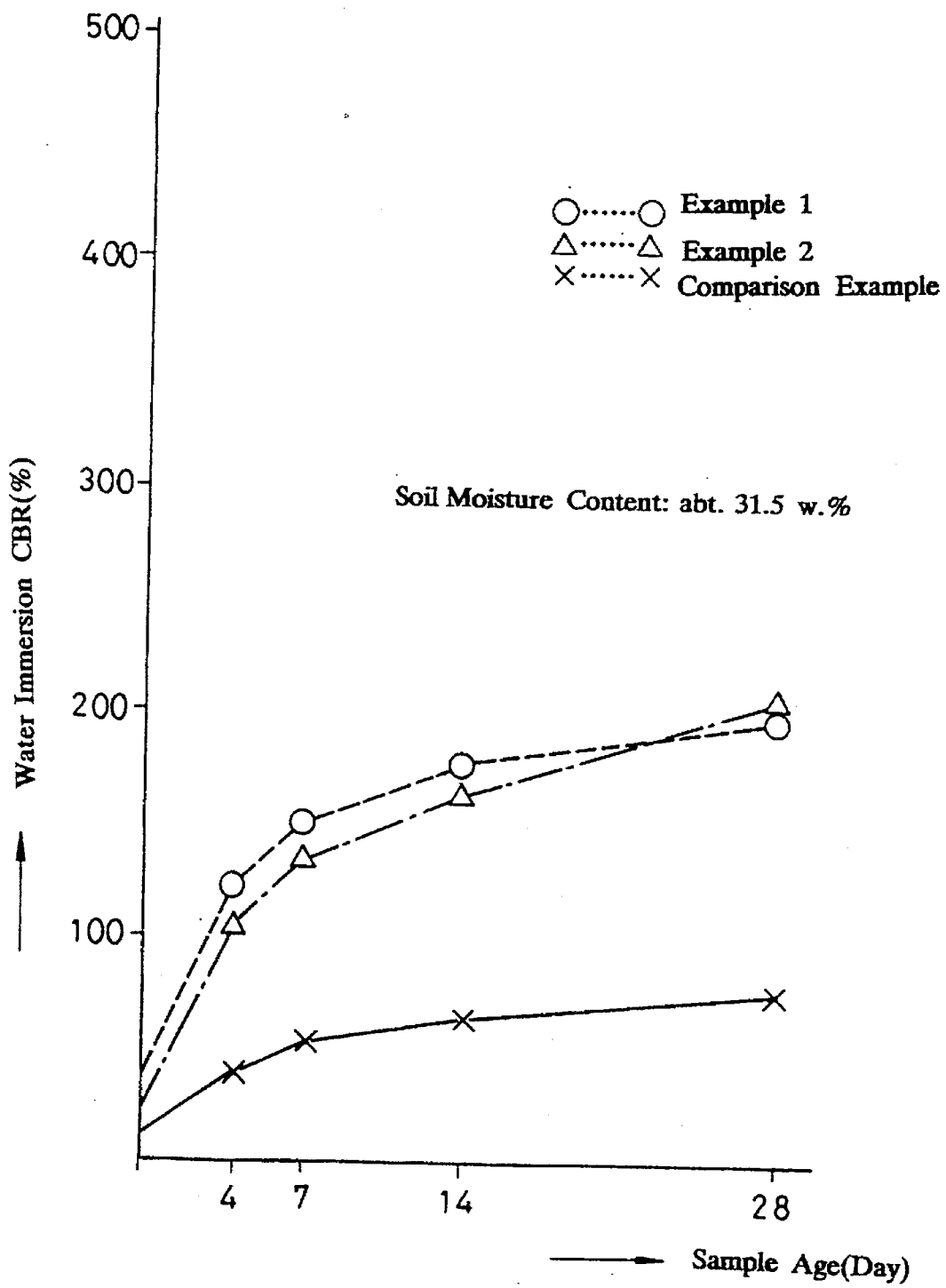

CBR Test Results of the sirsu having 25.5%, 28.5% and 31.5% moisture content (the soil or ground quality stabilizer adding ratio: about 7%) are shown in FIGS. 13, 14 and 15.

As the test results clearly indicate, the CBR strengths of the sirsu treated with the Fe (Ash-lime) at any moisture contents in Examples 1 and 2 were much higher than those treated with the Fe lime in Comparison Example.

Figure 16:
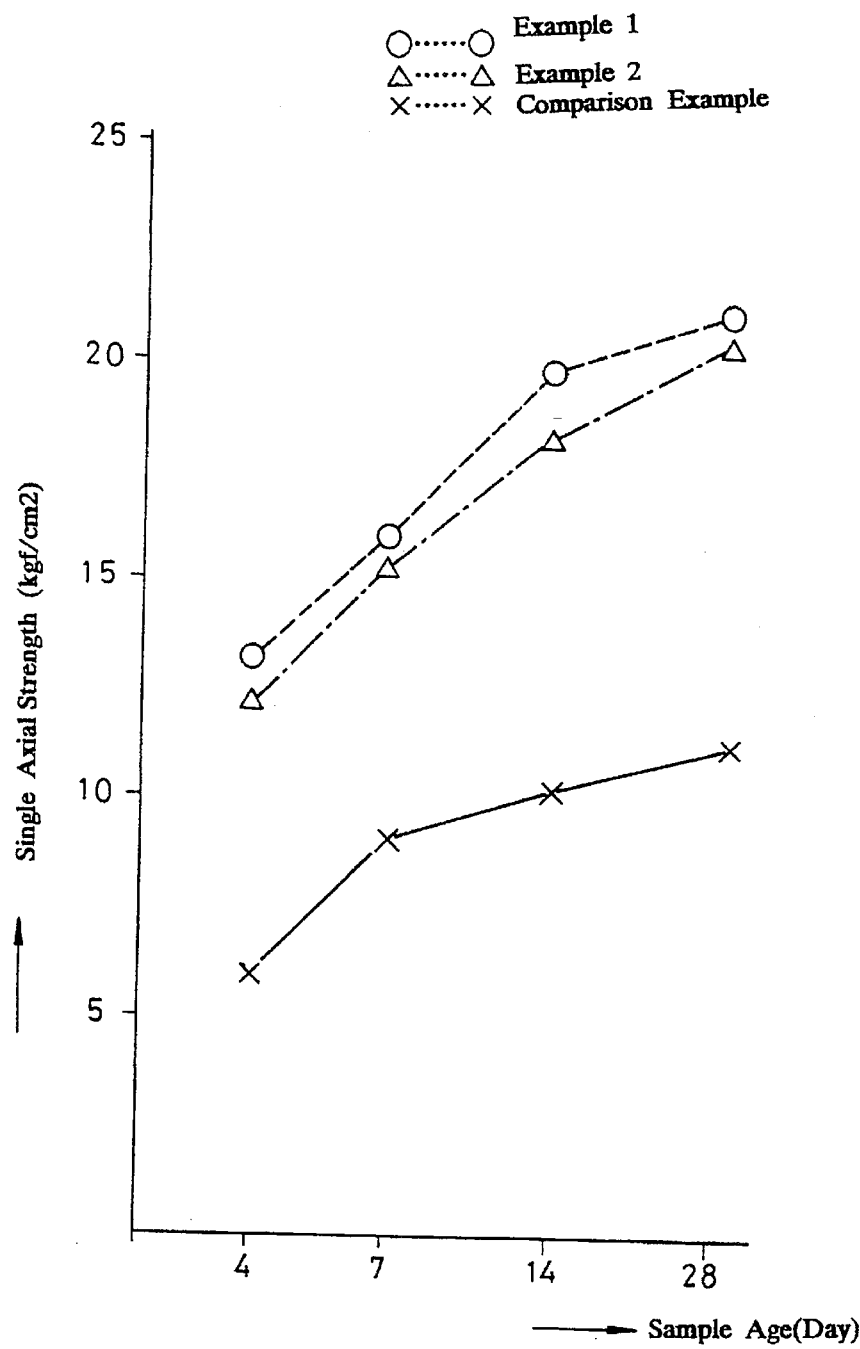

FIG. 16 shows Single Axial Compression Test Result of the sirsu (natural moisture content: about 22.5%) added and mixed by about 7% (dry weight compound) with the soil or ground quality stabilizer indicated in Table 4.

With regard to the relation between the sample age and the single axial strength ($kgf/cm^2$) of the soil treated with Fe (Ash-lime) in Examples 1 and 2, the strength was much higher than that of the soil treated with the Fe lime of the Comparison Example with all the sample ages.

Figure 17:
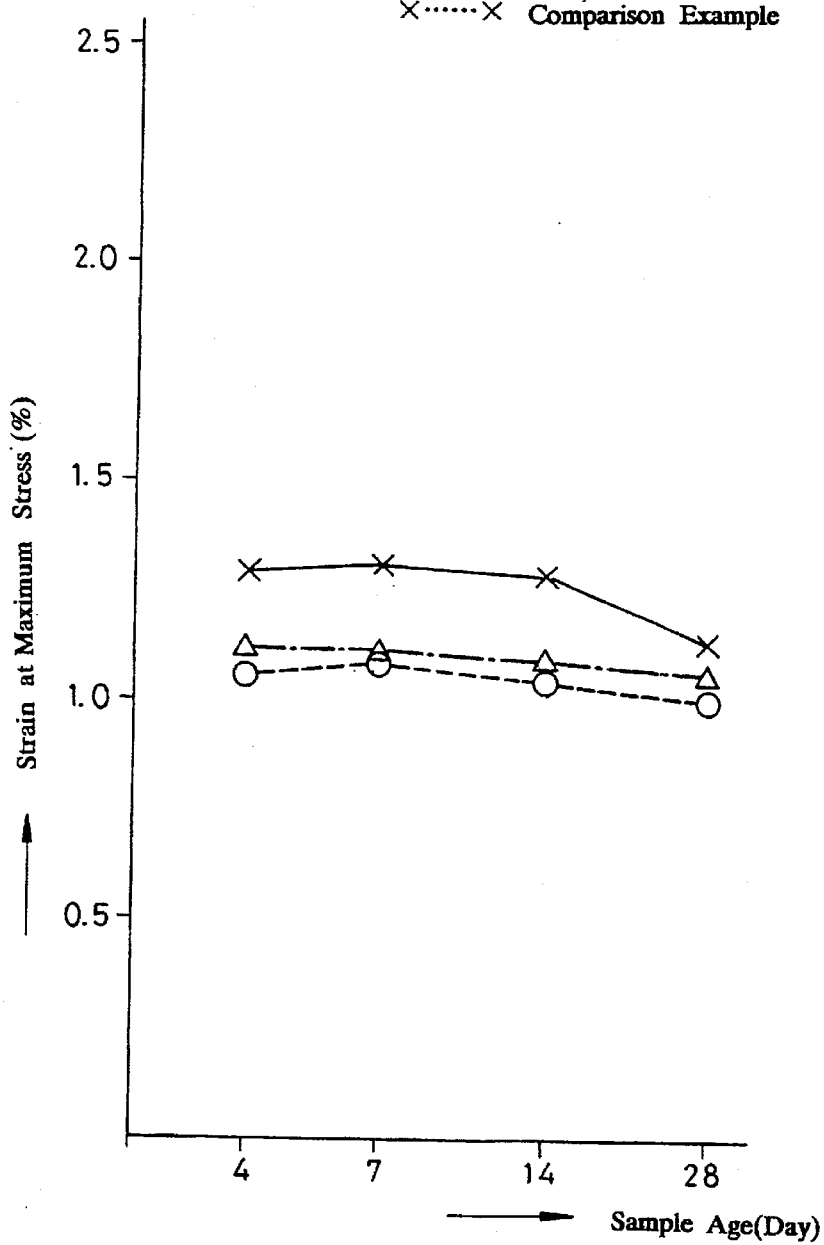

FIG. 17 indicates Single Axial Strain at the maximum stress of the sirsu (natural moisture content: about 22.5%) added and mixed by about 7% (dry weight compound) with the soil or ground quality stabilizer shown in Table 4.

The single axial strain at the maximum stress of the sirsu mixed with the soil or ground quality stabilizer in Examples 1 and 2 was a little lower than that of the one mixed with the Fe lime with the increase in the sample age but it has become close to the same after 28 days and was a permissible value considering from other properties of the strength. The properties of the decomposd granite and the sirsu mixed with the soil or ground quality stabilizer according to the present invention are as set forth above. The optimal mixing ratio of Fe oxides mixture to the mixture of the burned sewage sludge ash and the slaked lime is within the range of 15–35 weight %. The flexibility was poor at the mixing rate below 15% and the strength has decreased above 35 weight %.

The soil or ground quality stabilizer treatment method according to the present invention is able to give an increased strength together with a cushion action of the viscoelasitic performance to a pavement material containing cruched stones, natural soil, etc. by mixing the burned sewage sludge ash with the slaked lime to reduce the hydraulicity and further mixing with the fine Fe oxides mixture powder. When this stabilizer is used as a pavement construction material, the strength enhancement gives a dispersion effect of load to reduce the deflection by wheel load of the pavement and the viscoelasticity absorbs the shock load of traveling vehicles to prevent the structural destruction of the pavement or the fluid rutting of asphalt pavement materials and thus greatly extend the service life of the pavement.

The soil or ground treated with the conventional Fe lime had such a problem that specified strength could not be obtained with an increase in the moisture content.

The soil or ground treated with the Fe (Ash-lime) according to the present invention has maintained high strength with any moisture contents and at any ages.

For reference Tables 1–8 are described below and included hereinafter:

Table 1: Chemical Analysis of Burned Sewage sludge Ash

Table 2: Chemical Analysis of Fe Oxides Mixture (Steel Production Dust)

Table 3: Chemical Analysis of Slaked Lime

Table 4: Chemical Analysis of Main Contents of Fe (Ash-lime) Stabilizer.

Table 5: Physical Properties of Decomposed Granite

Table 6: Chemical Properties of Decomposed Granite

Table 7: Gravity and Partcles Distribution of Sirsu

Table 8: Chemical Analysis of Sirsu

TABLE 1

Chemical Analysis of Burned Sewage Sludge Ash (%)

| T. Fe | $SiO_2$ | CaO | MnO | MgO | $P_2O_5$ | $Cr_2O_3$ | $Al_2O_3$ | $TiO_2$ | $Na_2O$ | $K_2O$ | PH |
|---|---|---|---|---|---|---|---|---|---|---|---|
| 7.36 | 24.4 | 30.1 | 0.21 | 3.22 | 8.92 | 0.01 | 11.15 | 0.56 | 1.02 | 1.07 | 11.4 |

Analysed By Nippon Steel Corporation, Yawata Steel Mill
Each value is average of Samples 1 and 2.
T. Fe Total Fe.

TABLE 2

Chemical Analysis of Fine Iron Oxide Powder (%)

| Sample | T. Fe | M. Fe. | FeO | $Fe_2O_3$ | $SiO_2$ | CaO | MnO | MgO | $Al_2O_3$ | $TiO_2$ | C |
|---|---|---|---|---|---|---|---|---|---|---|---|
| Nippon Steel Wakamatsu | 67.19 | 0.59 | 0.27 | 94.92 | 0.48 | 0.01 | 0.80 | 0.04 | 1.02 | 0.05 | 0.16 |

Analysed By Nippon Steel Corporation, Yawata Steel Mill
M. Fe means Metallic Fe.

TABLE 3

Chemical Composition of Slaked Lime (%)

| Sample | $Ca(OH)_2$ | CaO | $CO_2$ | $SiO_2$ | $Al_2O_3$ | $Fe_2O_3$ | MgO |
|---|---|---|---|---|---|---|---|
| Slaked lime (Ito Industry) | 97.72 | 73.95 | 1.28 | | | | 1.22 |

TABLE 4

Chemical Analysis of Main Contents of Fe(Ash-lime) Stabilizer (%)

| | $Al_2O_3$ | $Fe_2O_3$ | $Ca(OH)_2$ | CaO | $SiO_2$ | $P_2O_5$ | Mixing Ratio Ash:$Ca(OH)_2$ |
|---|---|---|---|---|---|---|---|
| Example 1 | 3.38 | 26.18 | 43.97 | 9.03 | 7.44 | 2.68 | 40:60 |
| Example 2 | 1.76 | 25.07 | 58.63 | 4.50 | 3.78 | 1.34 | 20:80 |
| Comparison | 0.03 | 23.97 | 73.29 | — | 0.12 | — | 0:100 |

TABLE 5

Physical Properties of Decomposed Granite

| Soil Particle Specific G. | Particle Size (%) | | | | Consistency | | | By N. Moisture | | CBR |
|---|---|---|---|---|---|---|---|---|---|---|
| | Gravel | Sand | Silt | Clay | LL % | PL % | PI | Natural Moisture | Dry Density | CBR |
| 2.669 | 24.1 | 59.2 | 10.8 | 5.9 | 29.7 | 21.9 | 7.8 | 9.1% | 1.821 g/cm3 | 16.5% |

TABLE 6

Chemical Analysis of Decomposed Granite (%)

| T. Fe | $SiO_2$ | CaO | MnO | MgO | $P_2O_5$ | $Cr_2O_3$ | $Al_2O_3$ | $TiO_2$ | $Na_2O$ | $K_2O$ | PH |
|---|---|---|---|---|---|---|---|---|---|---|---|
| 1.69 | 74.5 | 0.01 | 0.07 | 0.45 | 0.02 | 0.01 | 16.8 | 0.36 | 3.36 | 3.46 | 8.00 |

TABLE 7

Specific Gravity and Particles Distribution of Sirsu

| | Particle size composition (%) | | | | | Hardened properties | | Natural moisture |
| --- | --- | --- | --- | --- | --- | --- | --- | --- |
| Soil Particle S.G. | Gravel | Sand | Silt | Clay | Consistency | Optimal moisture | Max. dried weight | (%) |
| 2.462 | 19.6 | 56.8 | 2.5 | 2.5 | NP | 21.3% | 1.300 g/cm$^3$ | 19.63 |

TABLE 8

Chemical Analysis of Sirsu (%)

| | T. Fe | $SiO_2$ | CaO | MnO | MgO | $P_2O_5$ | $Cr_2O_3$ | $TiO_2$ | $Al_2O_3$ | $Na_2O$ | $K_2O$ | pH |
| --- | --- | --- | --- | --- | --- | --- | --- | --- | --- | --- | --- | --- |
| Sand (Sirsu) | 2.65 | 75.0 | 3.20 | 0.10 | 0.97 | 0.08 | 0.05 | 0.44 | 16.4 | 3.38 | 2.26 | 7.3 |

Tested by Japan Steel Corporation Yawata Steel Mill

We claim:

1. A soil or ground quality stabilizer comprising a fine Fe oxides mixture, the main content of which is iron oxide, and a mixture formed by mixing a burned sewage sludge ash with a lime of calcium hydroxide to reduce hydraulicity.

2. The soil or ground quality stabilizer according to claim wherein the main contents of the burned sewage sludge ash are CaO, $SiO_2$ and $Al_2O_3$.

3. The soil or ground quality stabilizer according to claim 1 wherein the mixing ratio of the Fe oxides mixture to the mixture of the burned sewage sludge ash and the lime of calcium hydroxide is within the range of approximately 15–35 weight %.

4. A soil or ground quality stabilizer treatment method comprising:

preparing a soil or ground quality stabilizer formed by adding a mixture of a burned sewage sludge ash and a lime of calcium hydroxide having a reduced hydraulicity to a fine Fe oxides mixture, the main content of which is iron oxide;

adding the soil or ground quality stabilizer to a pavement material containing crushed stones and natural soil.

5. The soil or ground quality stabilizer treatment method according to claim 4 wherein the burned sewage sludge ash contains CaO, $SiO_2$ and $Al_2O_3$ as the main contents.

6. The soil or ground quality stabilizer treatment method accordng to claim 4 wherein the mixing ratio of the fine Fe oxides mixture to the mixture of the burned sewage sludge ash and the lime of calcium hydroxide is within the range of 15–35 weight %.

* * * * *